Figure 1:
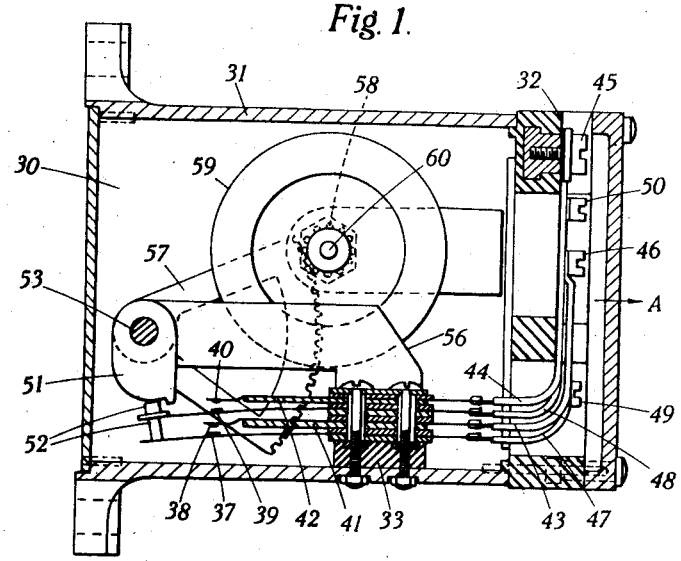

July 18, 1944.                H. M. SALMOND ET AL                2,353,764
                          GRAVITY OPERATED ELECTRIC SWITCH
                          Filed Oct. 23, 1939          3 Sheets-Sheet 1

Hubert Mackenzie Salmond
and
Anders Mathisen
Inventors by Ben. J. Chromy
their Attorney

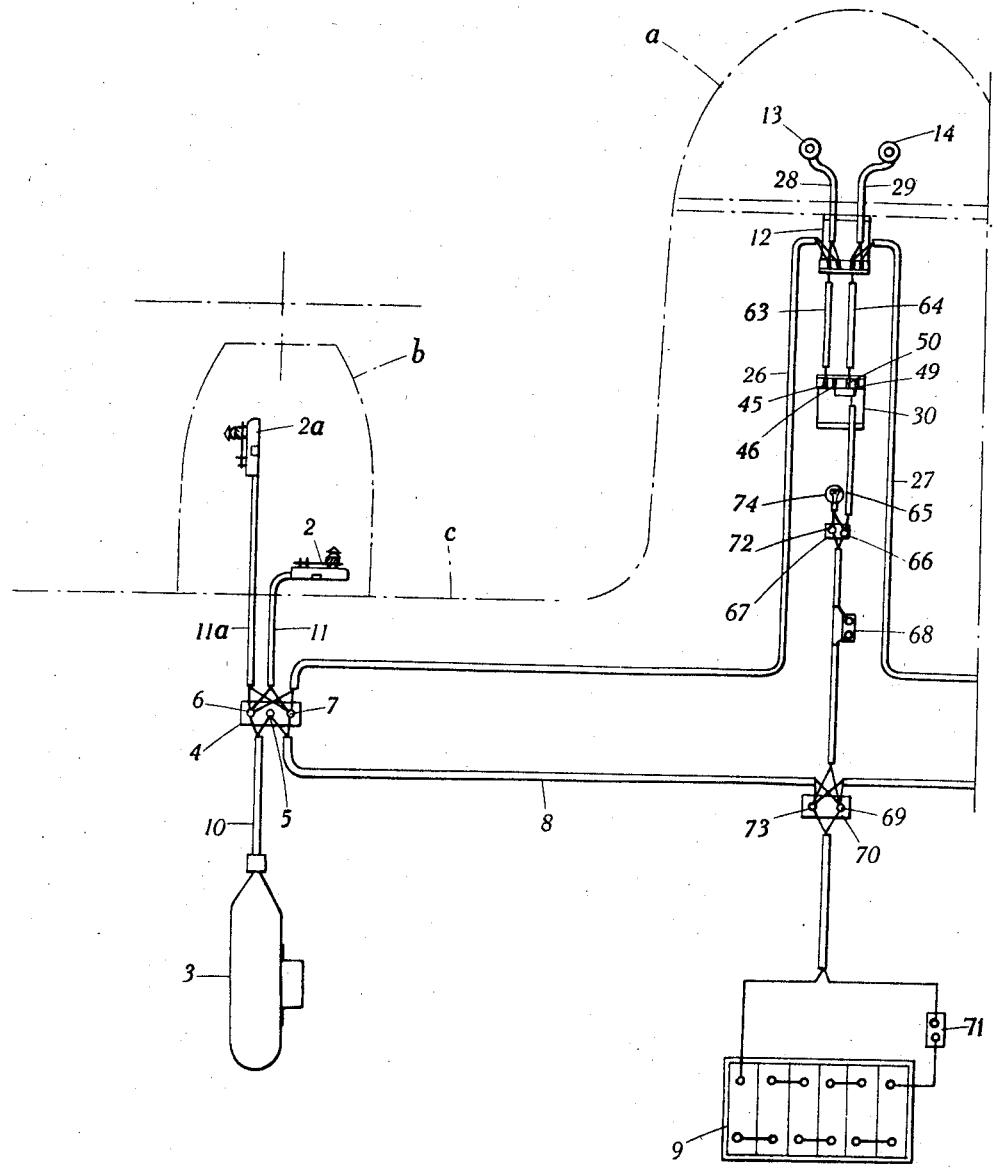

July 18, 1944.  H. M. SALMOND ET AL  2,353,764
GRAVITY OPERATED ELECTRIC SWITCH
Filed Oct. 23, 1939  3 Sheets-Sheet 3
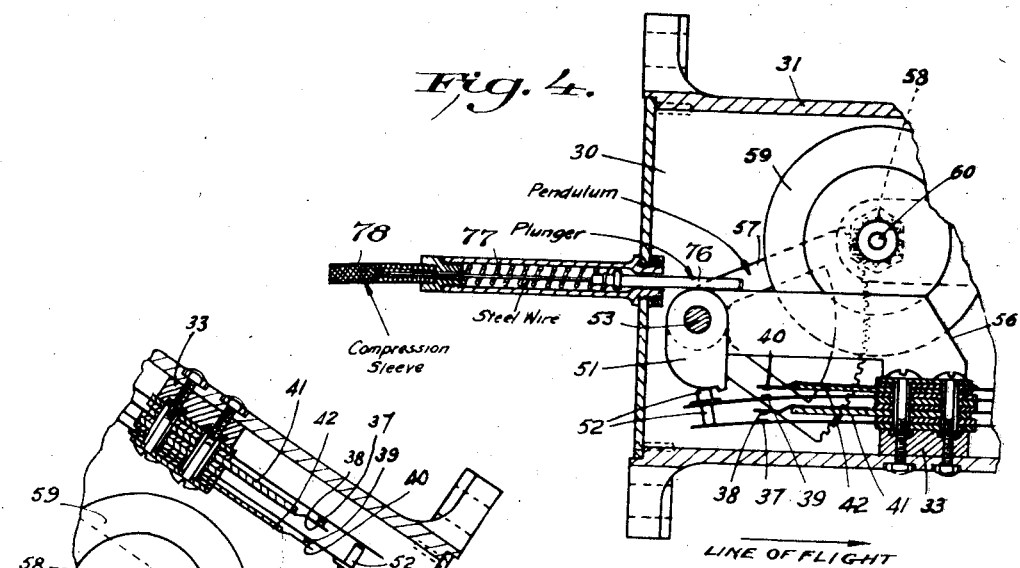
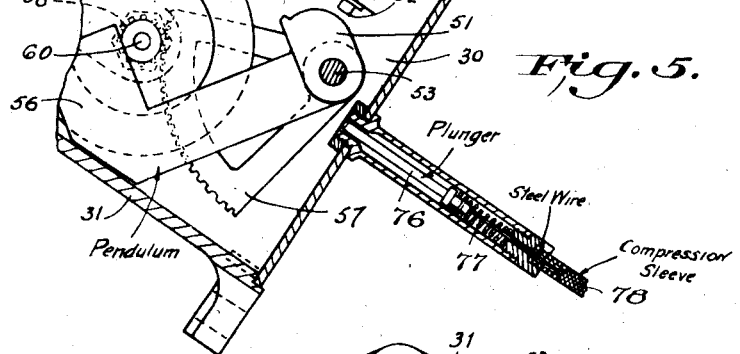
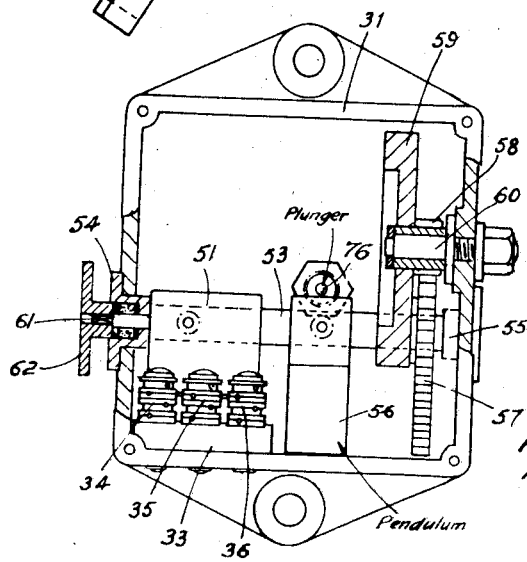
INVENTORS
HUBERT MACKENZIE SALMOND,
ANDERS MATHISEN,
BY
ATTORNEY Patented July 18, 1944

2,353,764

UNITED STATES PATENT OFFICE 2,353,764

GRAVITY OPERATED ELECTRIC SWITCH

Hubert Mackenzie Salmond, Fareham, and Anders Mathisen, Highborn, London, England, assignors to Graviner Manufacturing Company Limited, London, England Application October 23, 1939, Serial No. 300,833
In Great Britain November 17, 1938

2 Claims. (Cl. 200—52)

The invention relates to gravity operated electric switches and to the application and use of such switches for controlling automatically operable fire extinguishers in aircraft in particular and also for other purposes.

An object of the invention is to provide means for effecting discharge of fire extinguishers in aircraft when the aircraft accidentally overturns, as for example may happen during a forced landing or on the unskillful application of the wheel brakes resulting in the risk of overturning of the aircraft, without involving such crash conditions as to ensure operation of inertia element controlled switches.

Another object of the invention is to provide control means for such gravity operated switches to prevent the operation thereof during intentional inversion of an aircraft, as for example may occur during aerobatic evolutions.

A further object of the invention is to provide for such gravity operated switches, means for restraining or damping the operation of the switch so that it does not operate during bumpy landings and during other such jerking of the aircraft, but nevertheless functions if the aircraft overturns.

A still further object of the invention is to provide means for preventing or rendering ineffective the operation of a gravity switch on an aircraft, except when the aircraft is about to alight.

Yet another object of the invention is to provide means operated by an element of the aircraft which functions only when the aircraft is about to alight, to prevent operation of the switch or render its operation ineffective except when the aircraft is alighting.

The foregoing and other objects of the invention will be apparent from a consideration of the following description of a preferred form of gravity operated switch according to the invention, read in conjunction with the accompanying drawings, and also from a consideration of the automatic fire extinguishing system described and shown. A system in which the gravity operated switch herein discussed is employed, is described in U. S. Patent No. 2,189,147, issued February 4, 1940, to A. Mathisen.

Figure 2:
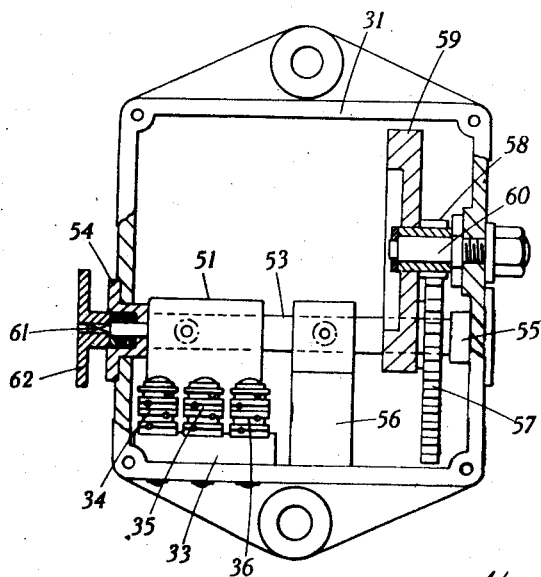

In the drawings,

Figure 1 is a longitudinal sectional view of a preferred form of gravity operated switch according to the invention, Figure 2 is an end elevation of the switch shown partly in section, Figure 3 is a diagram showing the distribution of equipment and the electrical wiring system for a twin-engined aircraft fitted with fire fighting equipment which operates automatically when the aircraft overturns accidentally, Figure 4 is a longitudinal sectional view of a modified form of the gravity operated switch in normal horizontal position, showing a remotely controllable plunger engageable to lock the switch in normal operating position except when the aircraft is about to alight, and engaged in locking position, Figure 5 is a view similar to Figure 4 showing the switch casing rotated through 135°, with the plunger retracted and disengaged, and the switch actuated into engaging position, and Figure 6 is an end elevation of Figure 4, with parts in section.

Referring to the drawings, and particularly to Figure 3, letter $a$ denotes the fuselage or hull of an aircraft and $b$ the engine nacelles built out on the wings $c$ of the aircraft. The fire-fighting equipment comprises fire extinguishing liquid containers 3 associated one with each individual engine. These extinguishers are of the type adapted to operate in the upright or inverted positions. Associated with each engine are two flame or temperature rise responsive devices denoted 2 and 2a in Figure 3. The equipment in individual engine nacelles comprises a three-way terminal block 4, provided with a center terminal 5 and outer terminals 6 and 7. In Fig. 3 there is shown only the left engine nacelle $b$, with its devices 2 and 2a, container 3, and terminal block 4. The right engine nacelle $b$, which is not shown, is a duplicate of the left nacelle, and has its own devices as 2 and 2a, container 3, and terminal block 4, which are duplicates of those shown for the left nacelle. A twin-lead cable 8 extending from any suitable electric current supply source such as the aircraft battery 9 has the leads connected to terminals 5 and 7, and a twin-lead cable 10 from container 3 has the leads connected to terminals 5 and 6, switches 2 and 2a having the leads from their twin-lead cables 11 and 11a connected to terminals 6 and 7, so that closure of the contacts in switch 2 or in switch 2a energise the fuse in the fire-extinguishing liquid container 3.

An inertia element operated switch 12 is mounted forward in the lower part of the fuselage or hull $a$ as shown in Figure 3, so that in an accidental crash, the switch will operate at the first moment of impact to effect discharge of all the containers 3 before or during severance of the engine from the aircraft.

In addition to switches 2, 2a and 12, manually operated push button switches 13 and 14 are provided in the pilot's compartment so that if either one of the engines catches fire during flight or during starting up, the pilot can effect discharge of the appropriate container 3 by pressing the push button switch appertaining thereto.

The terminals of the push button 13 are connected by a twin cable 28 across the terminals of one pair of contacts in the inertia operated switch 12, whereas the terminals of the other push button 14 are connected by a twin-lead cable 29 across the terminals of the other pair of contacts of the inertia operated switch.

The terminals of one of these pairs of contacts are connected by a twin cable 26 to the outer terminals 6 and 7 of one of the terminal blocks 4, and those of the other pair of contacts are connected by a twin cable 27 to the outer terminals of the other terminal block 4 (not shown).

In addition to the above described equipment, a gravity operated switch 30, similar to the one shown in detail in Figures 1 and 2, is provided for the purpose of effecting discharge of both of the containers 3 in the event of the aircraft accidentally overturning, as for example on alighting, without subjecting the aircraft to sufficient impact to cause the impact operated switch 12 to function.

Referring to Figures 1 and 2, the gravity operated switch shown here comprises a suitable casing 31 for the mechanism, having an insulating terminal block 32 forming its front cover. A block of insulating material 33, supporting six pairs of contacts is secured to the bottom side of the casing 31 by bolts, the contacts being arranged in three banks 34, 35, and 36, each bank comprising two pairs of contacts such as the pairs 37, 38, and 39, 40 shown in Figure 1.

The upper contact of each pair, such as 38 and 40, is supported by a backing plate such as 41 and 42 respectively, and these contacts are provided with soldering tags whereby they are connected by wires such as 43 and 44, to terminals such as 45 and 46, respectively, in the insulating terminal block 32.

The lower contacts of the pairs thereof, such as 37 and 39, are similarly connected by wires such as 47 and 48 to terminals such as 49 and 50 respectively, and are biased normally towards their respective co-operating contacts such as 38 and 40 respectively. These contacts however are normally held out of engagement with their co-operating contacts by means of a cam 51 against which bear studs, such as the stud 52 shown, carried at the ends of the supporting arms for the lower movable contacts of each bank, these studs also serving to retain the movable contacts of each bank in correct spaced relationship.

The cam 51 is mounted on a shaft 53 which is rotatably mounted at its ends in bushes 54 and 55, secured in the sides of the casing 31, and is arranged so that on inversion of the switch it will be rotated relatively thereto by means of a pendulum weight 56 secured to the cam shaft 53, which weight falls after the switch has been rotated clockwise as seen in Figure 1, through an angle of between 90° and 180°, that is the angle corresponding to the turning over on to its back of an aircraft on alighting. As seen in Fig. 1, the pendulum 56 in normal position engages a part of casing 31 which constitutes an abutment, when casing 31 is in the normal position shown. When casing 31 has been rotated with the craft through a sufficient angle when the latter has turned to an emergency position, pendulum 56 swings to actuating position and therebeyond to a limiting position until it engages another part of casing 31 constituting a second abutment. When the shaft 53 is thus rotated relatively to the casing 31, the studs 52 move towards the cam shaft 53, until the lower movable contact of each pair thereof, such as the contacts 37 and 39 of the bank 34, engages the upper fixed contact of the pair, such as 38 and 40 respectively, and all six pairs of contacts are thus simultaneously closed.

In order to retard the movement of the pendulum 56, so that this does not tend to rotate relatively to the casing 31 when the latter is moved up and down, as for example might occur during a bumpy landing, a toothed segment 57 is secured at its center of curvature to the cam shaft 53, and the teeth thereof mesh with teeth of a pinion 58 attached to an inertia wheel or flywheel 59, which is rotatably mounted on a shaft 60 secured in the side of the casing 31. The pendulum is thus free to move into its operating position with a comparatively small time lag when the aircraft turns over on its back, but does not move into this position if jolted only without being inverted.

In order that the contacts 37, 38 and 39, 40 may be closed for test purposes, the cam shaft 53 is provided with a squared extension 61 which protrudes beyond the exterior of the bush 54 in the side of the switch casing 31, and a detachable setting wheel or knob 62, having a knurled edge and a squared axial hole is arranged for engagement with the extension 61 to rotate the cam shaft and restore the pendulum to its normal position.

The switch shown in Figures 1 and 2 is adapted for operating six separate extinguishers, and where, as in the case of the arrangement shown in Figure 3, only two extinguishers are employed, it is only necessary to provide one bank of contacts, such as the bank 34 supporting the two pairs of contacts, 37, 38 and 39, 40. In such an arrangement, the terminals 45 and 50 are connected by separate connections 63 and 64 respectively to corresponding terminals on the inertia operated switch 12, and the terminals 46 and 49 are both connected by a single wire 65 to one terminal 66 of a two-way terminal block 67. This terminal 66 is connected by a single wire to one terminal of a switch 68 which is operated by the retractable undercarriage mechanism for the aircraft so that the switch is closed only when the undercarriage is in position for the aircraft to alight. The other terminal of the switch 68 is connected by a single wire to one terminal 69 of a two-way terminal block 70, which terminal 69 is connected through a fuse 71 to one terminal of the aircraft battery 9. The other terminal 72 of the two-way block 67 is connected by a single wire to the other terminal 73 of the terminal block 70, which latter terminal is connected to the other terminal of the battery 9.

A lamp 74 is connected across the terminals 66 and 72 on the block 67 to indicate by glowing, when the switch 68 is closed, thus indicating that the retractable undercarriage is in position for alighting of the aircraft.

During flight, with the aircraft undercarriage retracted, the aircraft may thus be inverted during aerobatics so that the pendulum 56 closes the contacts 37, 38 and 39, 40 without any danger of the fire extinguishers being operated by the gravity switch, since the circuit including these contacts is open at the control switch 68.

By mounting the gravity operated switch close to the inertia operated switch, the length of cable necessary for the circuits is maintained at a minimum, but the switch may be mounted in any other part of the aircraft provided that it is mounted with the cam shaft 53 horizontal and perpendicular to the direction of flight, and with the top side of the casing 31 upwards and horizontal. Preferably the switch should be arranged with respect to the travel of the aircraft so that it is directed in the line of flight as shown by the arrow A in Figure 1.

It will be evident that many other different forms of control devices may be used instead of the control switch 68, and that this control switch may be operated by means other than the undercarriage retracting mechanism. The switch 68 may for example be operated by wing slots which are actuated either manually or automatically when the aircraft is about to alight, or it may be operated by altitude responsive means so that the switch is closed only when the aircraft is within a certain height from the ground.

As shown in the modified form of Figs. 4, 5, 6, instead of the electric control of the circuits of the gravity operated switch 30, this switch may be rendered inoperative by means of a plunger 76 which is urged into contact with the pendulum 56 or a part connected thereto, to prevent movement thereof except when the aircraft is about to alight. Such a plunger may be operated for example by means of a steel wire tension cable 77 in a compression sleeve 78, which cable is actuated by the retractable undercarriage mechanism or other device which operates when alighting, to withdraw the plunger from the pendulum or other part and permit operation of the gravity switch if the aircraft overturns.

Alternatively, the control switch 68 or the locking plunger may be operated from the engine throtle control so as to render the gravity switch operable when the throttle is closed on alighting.

It will also be evident that instead of using the inertia wheel 59, for damping the movements of the pendulum, any other suitable form of damping device may be employed. For example, a spring urged ball or plunger may be arranged to bear against the side or end of the pendulum, preferably engaging a small detent therein, or a leaf spring may be arranged to bear at one end on the pendulum such that the pendulum is permitted to revolve about the cam shaft only when the switch is completely inverted.

Having thus fully described our invention, what we claim as new and desire to protect by Letters Patent is:

1. In a gravity operated inversion switch, a casing comprising an abutment, a shaft rotatably mounted on said casing, a cam keyed on said shaft, a pendulum member fixedly mounted on said shaft extending in only one direction therefrom and adapted to engage said abutment, said abutment being so positioned on said casing that when said casing is in normal position said pendulum member will rest in substantially horizontal position against said abutment, switch means actuatable by engaging means engageable with the contour of said cam, the said cam having its contour so shaped that when said pendulum member rests against said abutment said engaging means holds said switch means in the unactuated position, and when said pendulum member is substantially displaced from said abutment said switch means is released into actuated position, and control means comprising a plunger member engageable with said pendulum member for locking the same in normal position and holding said switch means in unactuated position.

2. In a gravity operated inversion switch, a casing comprising an abutment, a shaft rotatably mounted on said casing, a cam keyed on said shaft, a pendulum member fixedly mounted on said shaft extending in only one direction therefrom and adapted to engage said abutment, said abutment being so positioned on said casing that when said casing is in normal position said pendulum member will rest in substantially horizontal position against said abutment, switch means comprising a pair of contact fingers, one of said fingers being resilient and normally urged toward the other finger to make closed contact therewith, a stud carried on said resilient finger and engageable with the contour of said cam, said cam having its contour so shaped that when said pendulum member rests against said abutment said stud holds said resilient finger in open circuit position, and when said pendulum member is substantially displaced from said abutment said switch means is released into actuated position, and control means comprising a plunger member engageable with said pendulum member for locking the same in normal position and holding said switch means in unactuated position.

HUBERT MACKENZIE SALMOND.
ANDERS MATHISEN.